(12) United States Patent
Van De Veen et al.

(10) Patent No.: US 8,689,397 B2
(45) Date of Patent: Apr. 8, 2014

(54) VACUUM CLEANER

(75) Inventors: Egbert Van De Veen, Ijsselmuiden (NL); Fokke Voorhorst, Drachten (NL); Jeroen Herrewijnen, Elp (NL); Gijs Janssens, Beilen (NL); Lodewijk Anthonie Rijfkogel, Emmen (NL)

(73) Assignee: Koninklijke Philips N.V., Eindhoven (NL)

( * ) Notice: Subject to any disclaimer, the term of this patent is extended or adjusted under 35 U.S.C. 154(b) by 370 days.

(21) Appl. No.: 13/255,352

(22) PCT Filed: Mar. 11, 2010

(86) PCT No.: PCT/IB2010/051052
§ 371 (c)(1),
(2), (4) Date: Sep. 8, 2011

(87) PCT Pub. No.: WO2010/106471
PCT Pub. Date: Sep. 23, 2010

(65) Prior Publication Data
US 2012/0000032 A1  Jan. 5, 2012

(30) Foreign Application Priority Data
Mar. 17, 2009 (EP) .................................... 09155368

(51) Int. Cl.
*A47L 9/00* (2006.01)
*A47L 9/22* (2006.01)

(52) U.S. Cl.
USPC ............................................... 15/326; 15/412

(58) Field of Classification Search
USPC .................................................... 15/326, 412
IPC .................................................. A47L 9/00,9/22
See application file for complete search history.

(56) References Cited

U.S. PATENT DOCUMENTS

| | | | |
|---|---|---|---|
| 1,638,968 A | 8/1927 | Soderberg | |
| 1,866,154 A | 7/1932 | Ell | |
| 4,076,197 A | 2/1978 | Dochterman | |
| 5,813,085 A | 9/1998 | Fritz et al. | |
| 7,690,077 B2 * | 4/2010 | Biere | 15/326 |
| 7,788,763 B2 * | 9/2010 | Hwang | 15/326 |

FOREIGN PATENT DOCUMENTS

| | | |
|---|---|---|
| EP | 1118774 A2 | 7/2001 |
| EP | 1241371 A2 | 9/2002 |
| GB | 638702 A | 6/1950 |
| JP | 5084194 A | 4/1993 |
| JP | 2000135180 | 5/2000 |
| WO | 2008025957 A1 | 3/2008 |

\* cited by examiner

*Primary Examiner* — David Redding

(57) ABSTRACT

A vacuum cleaner (1) comprising a housing (2) being separated in at least a dust compartment (4) and a motor compartment (6). The vacuum cleaner (1) also comprises a motor (7) located in the motor compartment (6) and an air guide (8) between the dust compartment (4) and the motor (7). The motor (7) is suspended in the motor compartment (6) by a suspension system comprising at least one spring (23).

11 Claims, 7 Drawing Sheets

VACUUM CLEANER

FIELD OF THE INVENTION

The invention relates to a vacuum cleaner comprising a housing being separated in at least a dust compartment and a motor compartment, the vacuum cleaner also comprises a motor located in the motor compartment and an air guide between the dust compartment and the motor.

BACKGROUND OF THE INVENTION

By such kind of device the motor is suspended in a separation wall between the dust compartment and the motor compartment by means of a rubber mounting packing which covers and fixes the outer contour of the motor to the separation wall. The rubber mounting packing also forms the air guide.

Although it is intended by the known vacuum cleaner from the previous paragraph to obtain isolation of vibration of the motor and thereby reduce the phenomenon of shaking of the housing and the thereby produced vibration noise, by the known vacuum cleaner dynamic forces and the vibrations induced by these forces will still be transmitted by the rubber mounting packing to the housing via the separation wall due to a relatively high amount of damping.

SUMMARY OF THE INVENTION

It is an object of the invention to provide a vacuum cleaner whereby an improved isolation of the vibration of the motor is being obtained.

This object is being achieved by the vacuum cleaner according to the invention in that the motor is suspended in the motor compartment by a suspension system comprising at least one spring, whereby the natural frequency of the suspension system including the motor is at least 3 times lower than the excitation frequency of the motor whilst the spring has a damping less than 1%, the values for the suspension system being valid in all six degrees of freedom of displacement.

The natural frequency is the frequency in which the suspension system and the motor will oscillate about a resting position when this system has been moved from its resting position if there are no disturbing forces.

The excitation frequency of the motor is the frequency in which the suspension system and the motor will oscillate when the motor is running.

A damping of less than 1% is a damping whereby the actual damping is 1% of the critical damping of the suspension system.

The values for the suspension system are preferably valid in all six degrees of freedom of displacement so translation along x, y and z axis and rotation about these axis.

The damping is preferably less than 1% but more preferably less than 0.5% and even more preferably less then 0.1%.

With such a low damping of the spring and the relatively low natural frequency of the suspension system nearly no dynamic forces and vibrations induced by these forces will be transmitted from the motor to the housing. These values can easily be obtained from a transfer function of the suspension system including the motor.

The rubber mounting packing of the known device has a damping of approximately more than 4%.

One embodiment of the vacuum cleaner according to the invention is characterized in that at least one spring has a stiffness at least ten times higher than the stiffness of the flexible air guide.

Since the air guide is flexible and has a stiffness much lower than the stiffness of the spring the air guide will not influence the vibration isolation of the suspension of the motor by means of the spring. By being flexible the air guide is suitable for providing a leakage free sealing between the dust compartment and the motor compartment, whilst the motor is allowed to move with respect to the dust compartment.

The suspension of the motor is being done by the spring which together with the motor forms a low damped system making the vibration isolation very effective.

If there is more then one spring, the total stiffness of the springs must be ten times higher than the stiffness of the flexible air guide.

An embodiment of the vacuum cleaner according to the invention is characterized in that all dynamic forces of the motor travel to the housing via the spring and/or the air guide.

Since the air guide is relatively flexible and has a relatively low stiffness it will not form a vibration path from the motor to other parts of the vacuum cleaner.

Due to the relatively stiff suspension of the spring which together with the motor forms a low damped system, an effective vibration isolation will be obtained. Since all dynamic force of the motor will be transmitted via the spring and/or the air guide, no other contact between the motor and the other parts of the vacuum cleaner is available for the transmission of vibrations.

Another embodiment of the vacuum cleaner according to the invention is characterized in that the motor is suspended by at least two and more preferably three springs being fixed to the motor located near the centre of gravity of the motor. Preferably the springs comprise leaf springs.

By having the springs fixed to the motor located near the centre of gravity vibrations of the motor in radial, axial and torsion directions can easily be suppressed.

The point of action of the springs is preferably located in the centre of gravity to obtain optimum isolation.

Preferably the leaf springs are made of metal.

Such leaf springs can easily be designed to have the right stiffness and other characteristics in axial, radial and torsion direction.

A further embodiment of the vacuum cleaner according to the invention is characterized in that the air guide is a flexible air guide comprising a first ring-shaped element connected to a separation wall between the dust compartment and the motor compartment, a second ring-shaped element connected to the motor, which second ring-shaped element has a diameter smaller than the diameter of the first ring-shaped element, the air guide further comprises a dome shaped membrane between the first and second ring-shaped elements.

With such an air guide the motor can vibrate with respect to the separation wall whereby a leakage free sealing between the dust compartment and the motor is being maintained. Due to the dome shaped membrane movement of the second ring-shaped element with respect to the first ring-shaped element is possible. When pressure is applied on the membrane the dimension of the air inlet will change however maintaining an air inlet opening.

BRIEF DESCRIPTION OF THE DRAWINGS

The invention will now be explained with references to the drawings in which.

DETAILED DESCRIPTION OF THE EMBODIMENTS

Like parts are indicated by the same numerals in the various figures.

Figure 1:
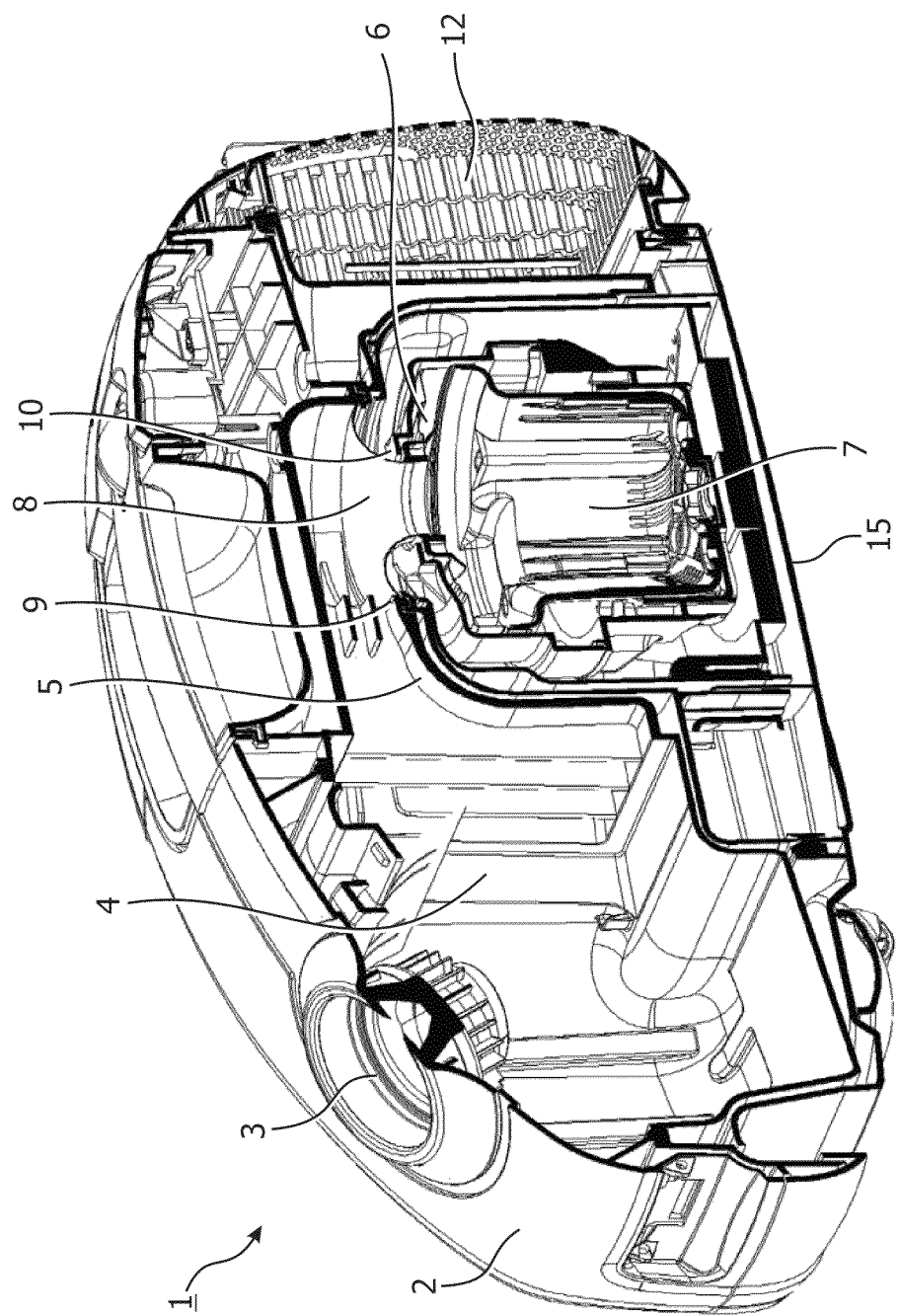
FIG. 1 is a perspective cross section of a vacuum cleaner according to the invention.

FIG. 1 shows a perspective cross section of a vacuum cleaner 1 of the invention. The vacuum cleaner 1 comprises a housing 2 with an air inlet opening 3 to a dust compartment 4. The housing 2 further comprising a separation wall 5 separating the dust compartment 4 from the motor compartment 6. In the motor compartment 6 a motor 7 is located. The vacuum cleaner 1 comprises a flexible air guide 8 connected with a first end 9 to the separation wall 5 and with a second end 10 to an impeller cover 11 (see FIG. 3) of the motor 7.

The housing 1 comprises an air outlet opening 12 which is connected via a duct (not visible) to the motor compartment 6.

The vacuum cleaner 1 further comprises a flexible hose (not shown) which is connectable to the air inlet opening 3, a metal tube (not shown) connected to an end of the flexible hose at a side remote for the air inlet opening 3 and a suction head (not shown) connected to an end of the metal tube remote from the connection between the metal tube and the flexible hose. Such flexible hose, metal tube and suction head are well known in the state of the art and therefore not further described.

Figure 3:
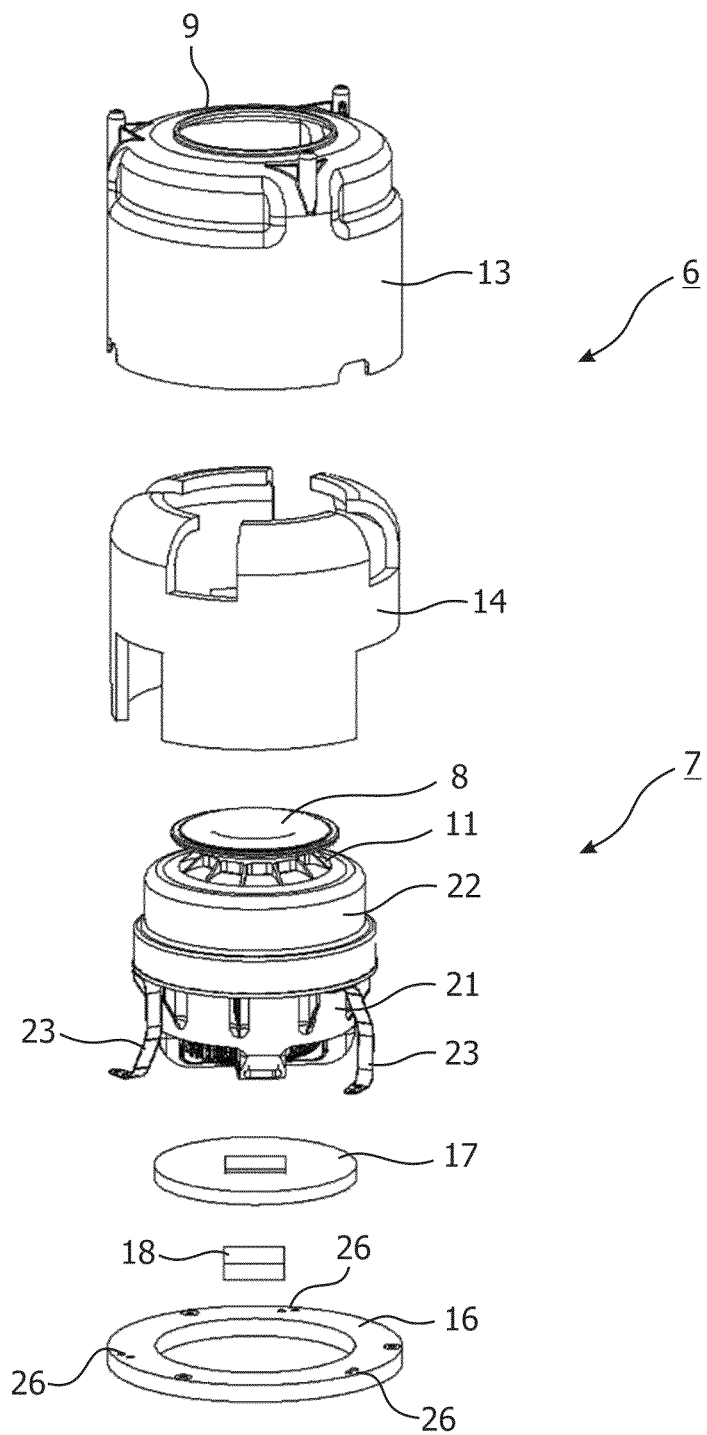
FIG. 3 is an exploded view of the motor compartment of the vacuum cleaner as shown in FIG. 1.
Figure 4:
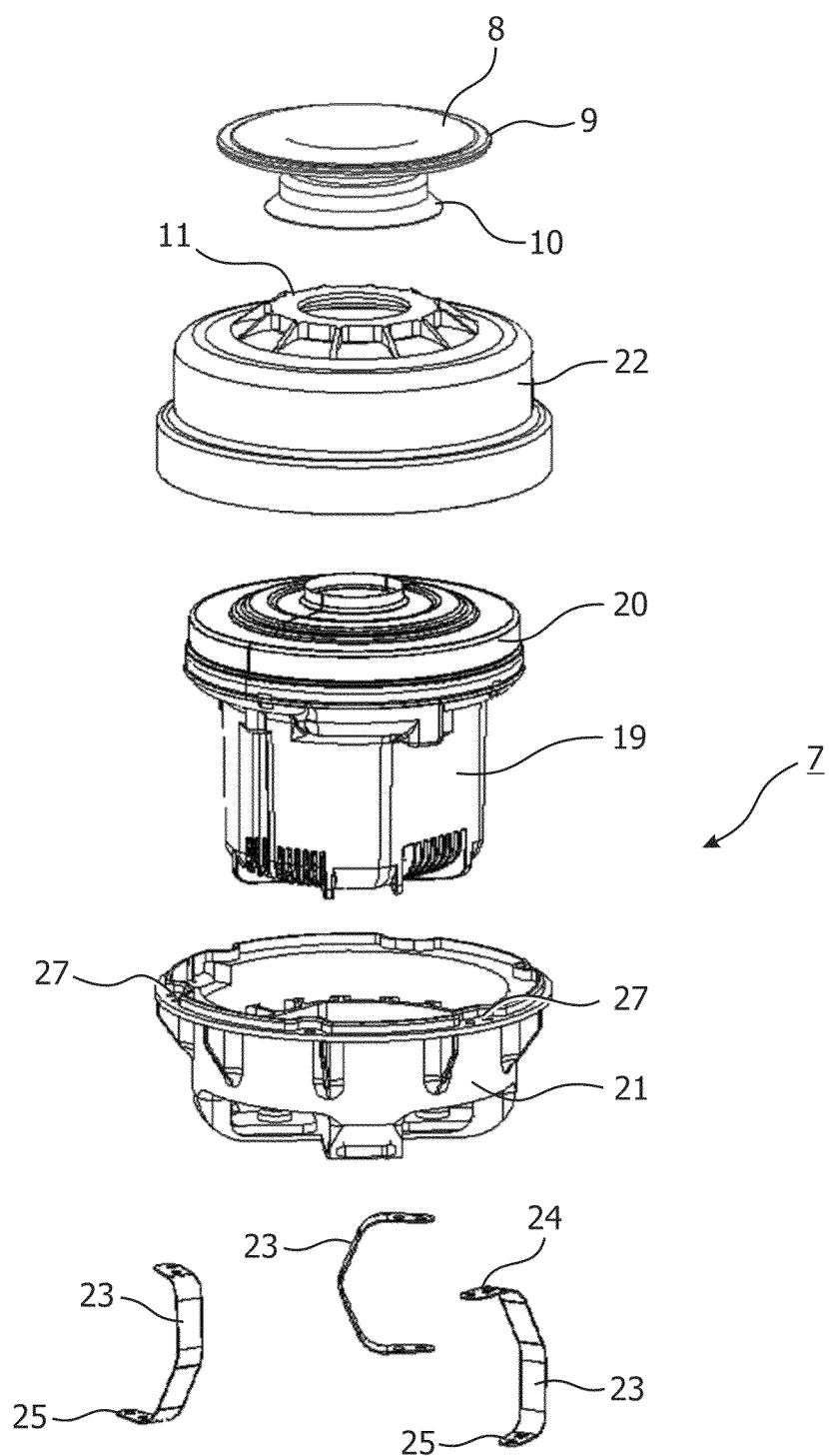
FIG. 4 is an exploded view of the motor, a flexible air guide and suspension of the vacuum cleaner as shown in FIG. 1.

FIG. 3 shows an exploded view of the motor compartment 6 in which the motor 7 is located. The motor compartment 6 is bounded by a cilindrical housing 13 which is provided on the inside with noise absorption material 14. The housing 13 is connected at its lower end to a bottom surface 15 of the housing 2. To the bottom surface 15 a metal ring 16 is connected, in which ring 16 a ring of air absorption material 17 is located. In the centre of said ring 17 a elastic buffer 18 is positioned, the function of which will be explained below. The motor 7 comprises, as is more clearly visible in FIG. 4, a motor part 19 with an impeller part 20 which are mounted in a lower bracket 21 and a upper bracket 22. The flexible air guide 8 is connected with its second end 10 to the impeller cover 11 of the upper bracket 22.

The motor 7 is suspended by means of three leaf springs 23 which leaf springs 23 are connected with a first end 24 to the lower bracket 21 and with a second end 25 remote from the first end 24 to the metal ring 16 at positions 26. The leaf springs 23 are made of metal and have a stiffness being at least ten times higher than stiffness of the flexible air guide 8.

The leaf springs 23 are connected with the first end 24 at position 27 to the lower bracket 21 which positions 27 are at the same level as the centre of the gravity of the motor part 19 and the impeller part 20.

Figure 5A:
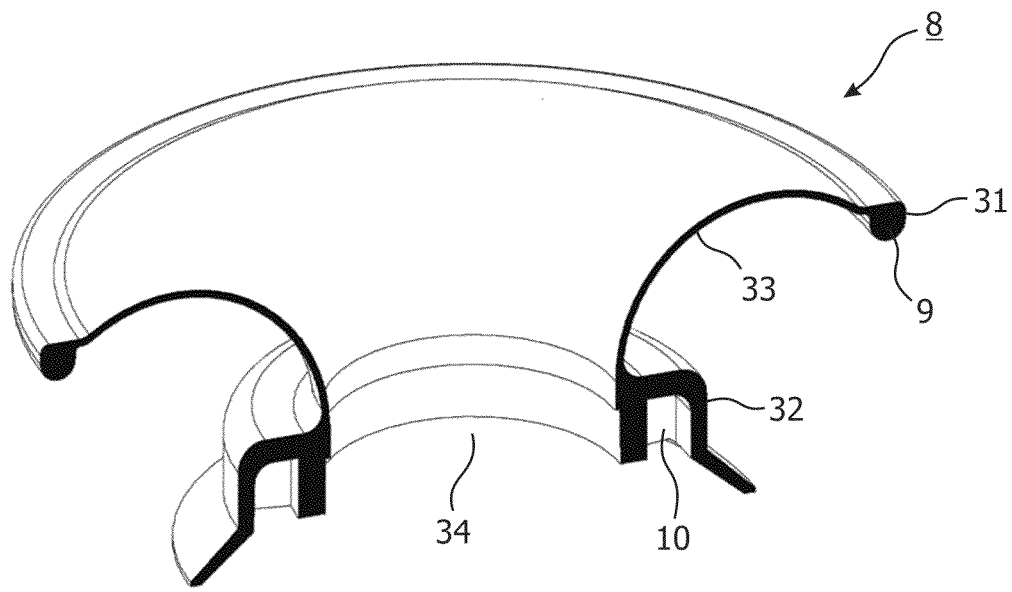
FIG. 5A is a perspective cross section of a first embodiment of a flexible air guide of the vacuum cleaner according to the invention.
Figure 5B:
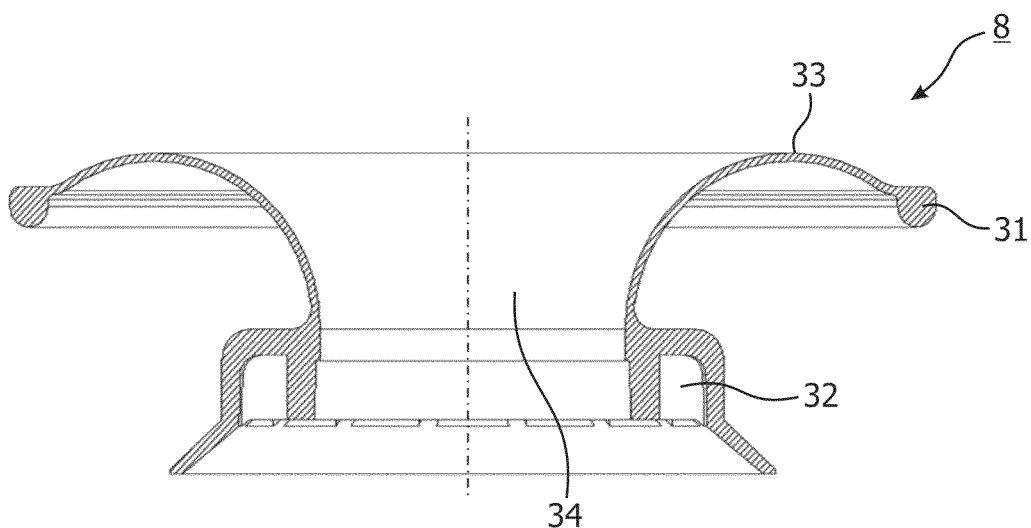
FIG. 5B is a cross section of the flexible air guide as shown in FIG. 5A.

FIG. 5A and 5B disclose the flexible air guide 8 which is at a first end 9 provided with a first ring-shaped element 31 and at the second end 10 with a second ring-shaped element 32 which is connectable in a airtight manner to the impeller cover opening 11 of the upper bracket 22. Between the first and the second ring-shaped elements 31, 32 the flexible air guide 8 is provided with a dome-shaped membrane 33 having a relatively low stiffness and having a thickness of about 0.8 mm.

In axial direction the first ring-shaped element 31 is located higher than the second ring-shaped element 32. Due to the different levels of the ring-shaped elements 31, 32 and the dome-shaped membrane 33 connecting both ring-shaped elements 31, 32 the ring-shaped elements 31, 32 and the objects connected thereto are movable with respect to each other both in axial, radial and torsion directions without the risk that the membrane 33 might block the inlet opening 34 of the flexible air guide 8.

Figure 6A:
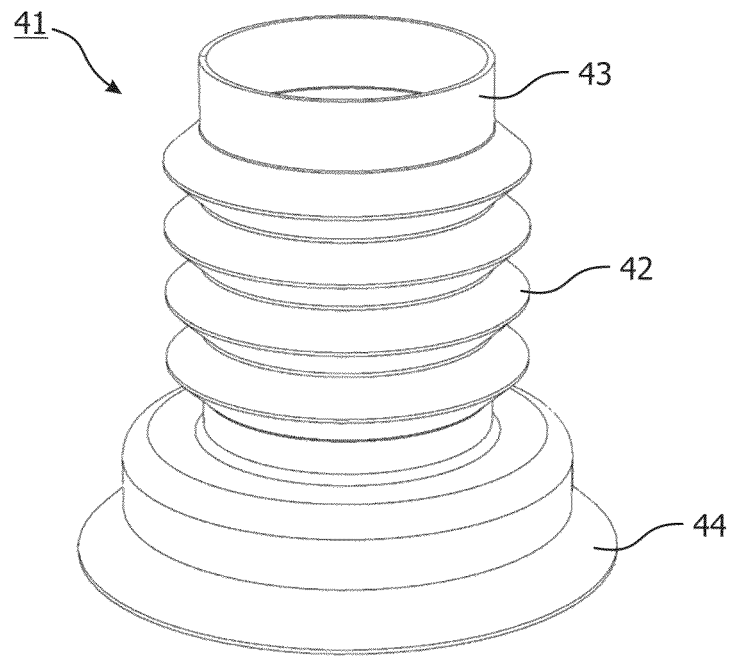
FIG. 6A is a second embodiment of a flexible air guide of the vacuum cleaner according to the invention.
Figure 6B:
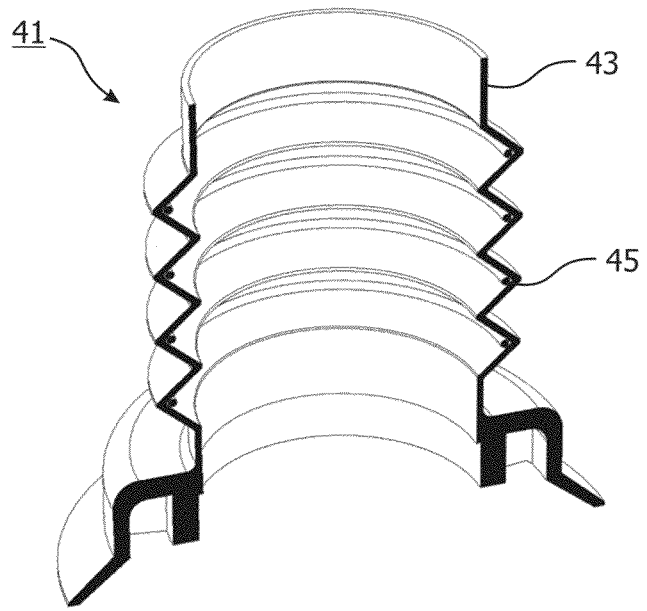
FIG. 6B is a perspective cross section of the flexible air guide as shown in FIG. 6A

FIG. 6A and 6B are a perspective view and perspective cross section of another embodiment of the flexible air guide 41 which flexible air guide 41 comprises a bellow 42. The bellow 42 is connected with a first end 43 to the end 9 of the separation wall 5 and with a second end 44 to the impeller cover 11 of the lower bracket 22.

Such a bellow 41 provides a leakage free air guide between the dust compartment 4 and the motor 7. Such a bellow 41 is made for example of rubber, has relatively thin walls and a relatively low stiffness. To prevent the bellow 41 to close whenever there is pressure applied to it, it contains metal rings 42.

Figure 7:
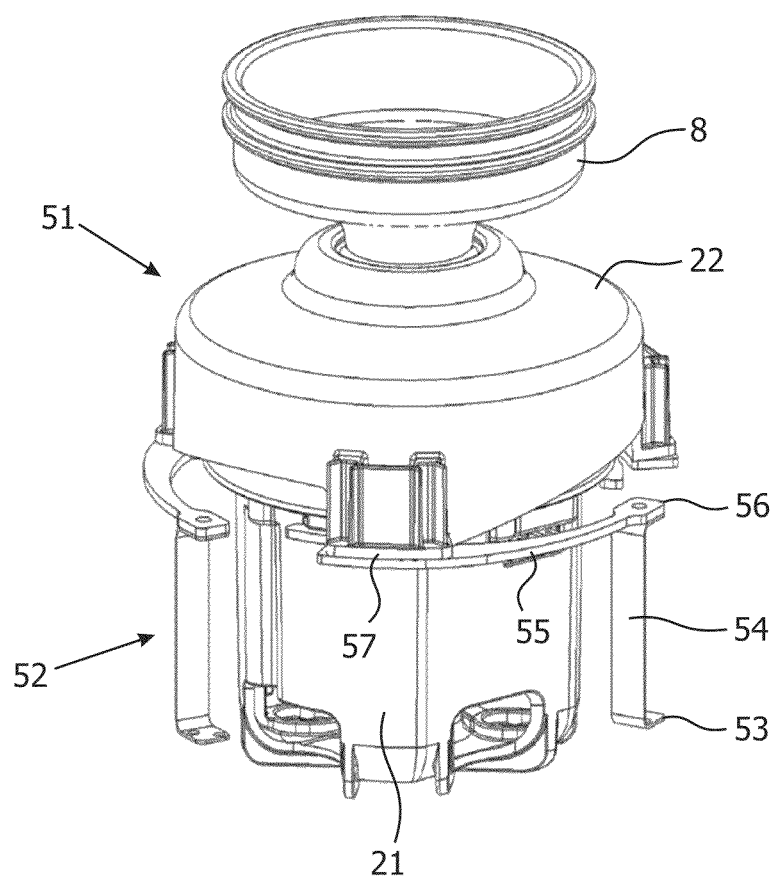
FIG. 7 is a further embodiment of a suspension of the motor of the vacuum cleaner according to the invention.

FIG. 7 shows another embodiment 51 of the motor 7 located in bracket 21, 22 and the suspension of the motor 7 by means of three springs 52. Each spring 52 has a connecting part 53 at its lower end by means of which the leaf spring 52 is connected to the metal ring 16. The leaf spring 52 comprises a vertical extending part 54 connected to the connecting part 53 and a horizontal extending part 55 which is connected with a first end 56 to the vertical extending part 54 and an end remote of the connecting part 53. The horizontal extending part 55 is connected with a second end 57 remote of the first end 56 to the upper bracket 22.

Such spring 52, preferably made of metal, provides a relatively high stiffness. The suspension of the motor 7 by means of the springs 23 or 52 of the motor 7 will now be explained with reference to FIG. 2.

Due to the springs 23, 52 the vibration isolation between the motor 7 and the housing 2 is being improved due to which a reduction of vibration level in the housing and therefor a reduction of the sound due to the vibrations is obtained. The motor 7 is suspended by means of the springs 23, 52 within the housing 2 of the vacuum cleaner 1 in a practical and safe way meaning that the motor 7 can easily provide the suction power and that the vacuum cleaner can withstand the mechanical impact of the motor 7.

The vibration isolation by means of the springs 23, 52 can be described with a mass-spring-damper model, whereby the motor 7 forms the mass. If a dynamic force is excitation the mass, the reaction force acting at the rigid world (housing 2) is a function of the frequency of the exciting force.

By normal use the motor is rotated between 45.000 à 57.000 rotations per minute. The excitation frequency is then 750-950 Hertz.

With suspension by means of metal springs a damping of about 0.1% of the critical damping of the suspension system including the motor can be realised.

Figure 2:
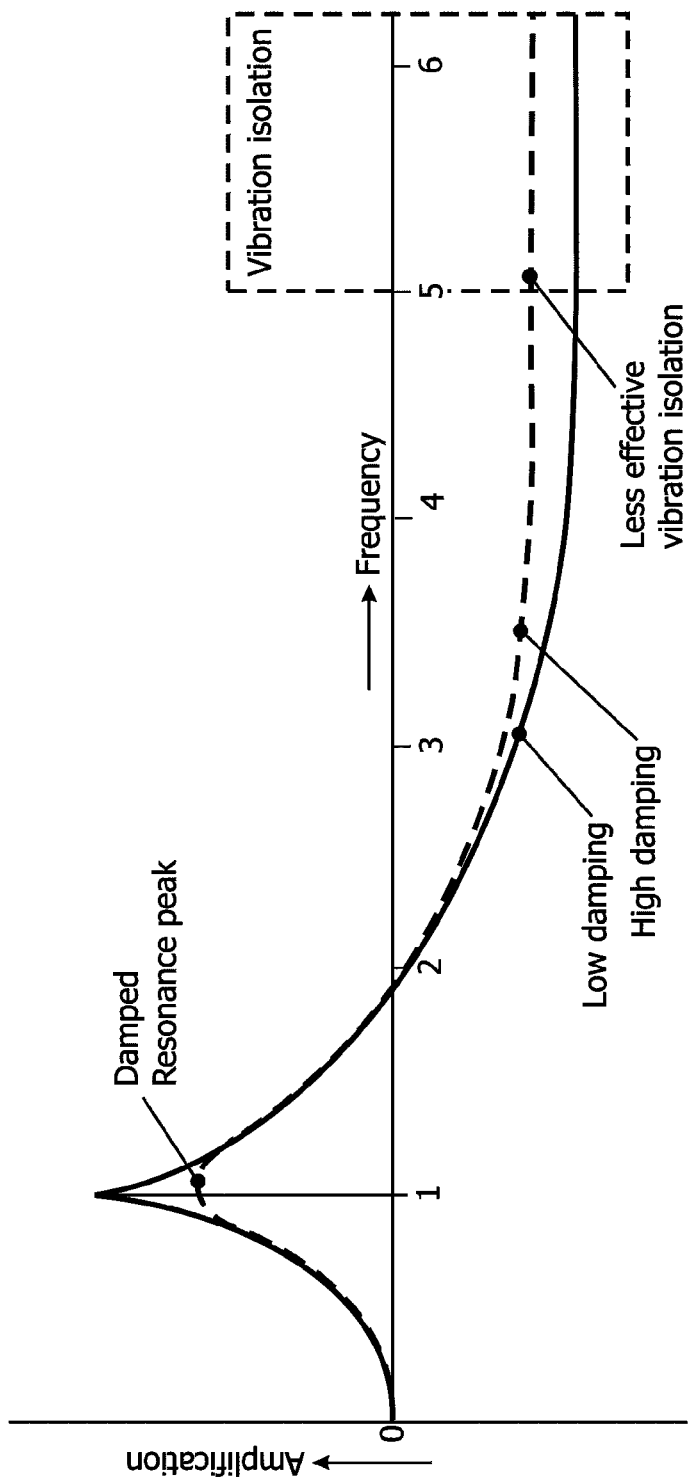
FIG. 2 is a diagram showing the frequency and the amplification at a certain frequency.

Since the suspension of the motor 7 of the vacuum cleaner 1 according to the invention has a low damping, the model can be considered to be a mass-spring model only but at frequencies much higher than the natural frequency of the mass-spring model, the reaction force is lower than the excitation force due to which vibration isolation is realised. With the springs 23, 52 the natural frequency of the complete suspension system (i.e. suspension system including the motor) is at least three times lower than the excitation frequency. FIG. 2 shows at the horizontal axis the frequency, whereby 1 means the natural frequency of the suspension and 2, 3, 4, 5 etc. meaning two times, three times, four times, five times the natural frequency. By the vacuum cleaner 1 according to the invention the natural frequency of the suspension is about 50-57 Herz. The vertical axis indicates the amplification of the movement caused by the excitation force.

By having a relatively low damping of less than 1% a more effective vibration isolation is obtained than in case of a high damping material like rubber.

By the vacuum cleaner 1 according to the invention the flexible air guide 8 provide a leakage free sealing between the dust compartment 4 and the motor 7. The flexibility of the air guide 8 is such that it does not influence the vibration isolation of the suspension of the motor 7 by means of the springs 23, 52 but has sufficient stiffness to withstand the pressure difference between the dust compartment 4 and the motor 7.

The suspension of the motor 7 by means of the springs 23, 52 ensures that the motor 7 is kept in its desired position and ensures vibration isolation.

The buffer 18 (see FIG. 3) is located at a distance from the lower bracket 21 but will protect the suspension against high stress level, for example in case that the vacuum cleaner is being dropped and will limit the maximum displacement of the springs 23 in axial direction. Since the flexible air guide 8, the suspension by means of the springs 23, 52 and the buffer 18 each have a different function, each element can be optimized for its specific function.

It is also possible to another number of springs, other kind of springs, or springs made of other kind of materials as long the springs provide for a low damping the suspension.

It is also possible to connect the springs directly to the motor part 19 instead to brackets surrounding the motor part 19.

The invention claimed is:

1. Vacuum cleaner (1) comprising a housing (2) being separated in at least a dust compartment (4) and a motor compartment (6), the vacuum cleaner (1) also comprises a motor (7) located in the motor compartment (6) and an air guide (8) between the dust compartment (4) and the motor (7), wherein the motor (7) is suspended in the motor compartment (6) by a suspension system comprising at least one spring (23), wherein the natural frequency of the suspension system including the motor is at least 3 times lower than the excitation frequency of the motor (7) whilst the spring (23) has a damping less than 1%, the values for the suspension system being valid in all six degrees of freedom of displacement.

2. Vacuum cleaner (1) according to claim 1, comprising in that the damping is less than 0.5%, preferably less than 0.1%.

3. Vacuum cleaner (1) according to claim 1, comprising in that at least one spring (23) has a stiffness at least ten times higher than the stiffness of the flexible air guide (8).

4. Vacuum cleaner (1) according to claim 1, comprising in that all dynamic forces of the motor (7) travel to the housing (2) via the spring (23) and/or the air guide (8).

5. Vacuum cleaner (1) according to claim 1, comprising in that the motor (7) is suspended by at least two springs (23) being fixed to the motor (7) located near the centre of gravity of the motor (7).

6. Vacuum cleaner (1) according to claim 1, comprising in that the motor (7) is suspended by at least three leaf springs (23).

7. Vacuum cleaner (1) according to claim 1, comprising in that the spring (23) is a metal spring.

8. Vacuum cleaner (1) according to claim 1, comprising in that the air guide (8) is a flexible air guide (8) comprising a first ring-shaped element (31) connected to a separation wall (5) between the dust compartment (4) and the motor compartment (6), a second ring-shaped element (32) connected to the motor (7), which second ring-shaped element (32) has a diameter smaller than the diameter of the first ring-shaped element (31), the air guide (8) further comprises a dome-shaped membrane (33) between the first and second ring-shaped elements (31, 32).

9. Vacuum cleaner (1) according to claim 8, comprising in that in axial direction the ring-shaped elements (31, 32) are located at a distance of each other.

10. Vacuum cleaner (1) according to claim 8, comprising in that the air guide (8) comprises a bellow (42).

11. Vacuum cleaner (1) according to claim 8, comprising in that the spring (23) is connected to the motor (7) by means of a bracket (21, 22).

\* \* \* \* \*